US011397317B2

(12) United States Patent
Cross et al.

(10) Patent No.: US 11,397,317 B2
(45) Date of Patent: Jul. 26, 2022

(54) AUTOMATIC POWER REDUCTION USING A PRE-SCANNED VIRTUAL PROTECTIVE HOUSING

(71) Applicant: Microvision, Inc., Redmond, WA (US)

(72) Inventors: Jonathan Cross, Tukwila, WA (US); Christopher Brian Adkins, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 280 days.

(21) Appl. No.: 16/579,223

(22) Filed: Sep. 23, 2019

(65) Prior Publication Data

US 2021/0088778 A1  Mar. 25, 2021

(51) Int. Cl.
*H04N 9/31* (2006.01)
*G02B 26/10* (2006.01)
*G06T 7/521* (2017.01)

(52) U.S. Cl.
CPC ......... *G02B 26/101* (2013.01); *H04N 9/3155* (2013.01); *G06T 7/521* (2017.01)

(58) Field of Classification Search
CPC ...... G02B 26/101; H04N 9/31; H04N 9/3155; G06T 7/521

USPC ................................ 353/85, 97, 88; 348/744
See application file for complete search history.

(56) References Cited

U.S. PATENT DOCUMENTS

| 8,182,093 | B2* | 5/2012 | Kurozuka | H04N 9/3161 |
| | | | | 353/37 |
| 9,374,566 | B2* | 6/2016 | Kilcher | G06F 3/017 |
| 9,596,440 | B2 | 3/2017 | Viswanathan et al. | |
| 9,651,417 | B2* | 5/2017 | Shpunt | G01J 1/44 |
| 10,145,680 | B2 | 12/2018 | Viswanathan et al. | |
| 10,823,826 | B2* | 11/2020 | Yang | G01S 7/484 |
| 2018/0247146 | A1* | 8/2018 | Riddle | G06V 10/145 |

* cited by examiner

Primary Examiner — Trang U Tran
(74) Attorney, Agent, or Firm — Kevin D. Wills

(57) ABSTRACT

A scanning laser projection system includes a virtual protective housing circuit to automatically reduce power levels of visible laser light pulses when necessary to render the laser projection system eye-safe. IR laser light pulses are scanned out in front of visible laser light pulses in a field of view, and emitted power of visible laser light pulses is modulated based on attributes of reflections of the IR laser light pulses.

16 Claims, 7 Drawing Sheets

AUTOMATIC POWER REDUCTION USING A PRE-SCANNED VIRTUAL PROTECTIVE HOUSING

FIELD

The present invention relates generally to laser projection systems, and more specifically to safety of laser projection systems.

BACKGROUND

Products that include laser devices generally fall into different laser safety classes based on the possibility that they can cause damage to the human eye or skin. International Standard IEC 60825.1 describes example laser safety classes. Although many different laser safety classes exist, one major distinction between classes is whether a product is considered "eye-safe" or "non-eye-safe." Eye-safe laser systems are generally considered to be incapable of producing damaging radiation levels during operation, and are also generally exempt from device marking requirements, control measures, or other additional safety measures. IEC 60825.1 classifies eye-safe products as Class1. Products that include high power laser devices that would otherwise be classified as non-eye-safe, may nevertheless be classified as eye-safe if the product includes additional safety measures such as a protective housing that reduces the accessible emission limits to a safe level.

DESCRIPTION OF EMBODIMENTS

Figure 1:
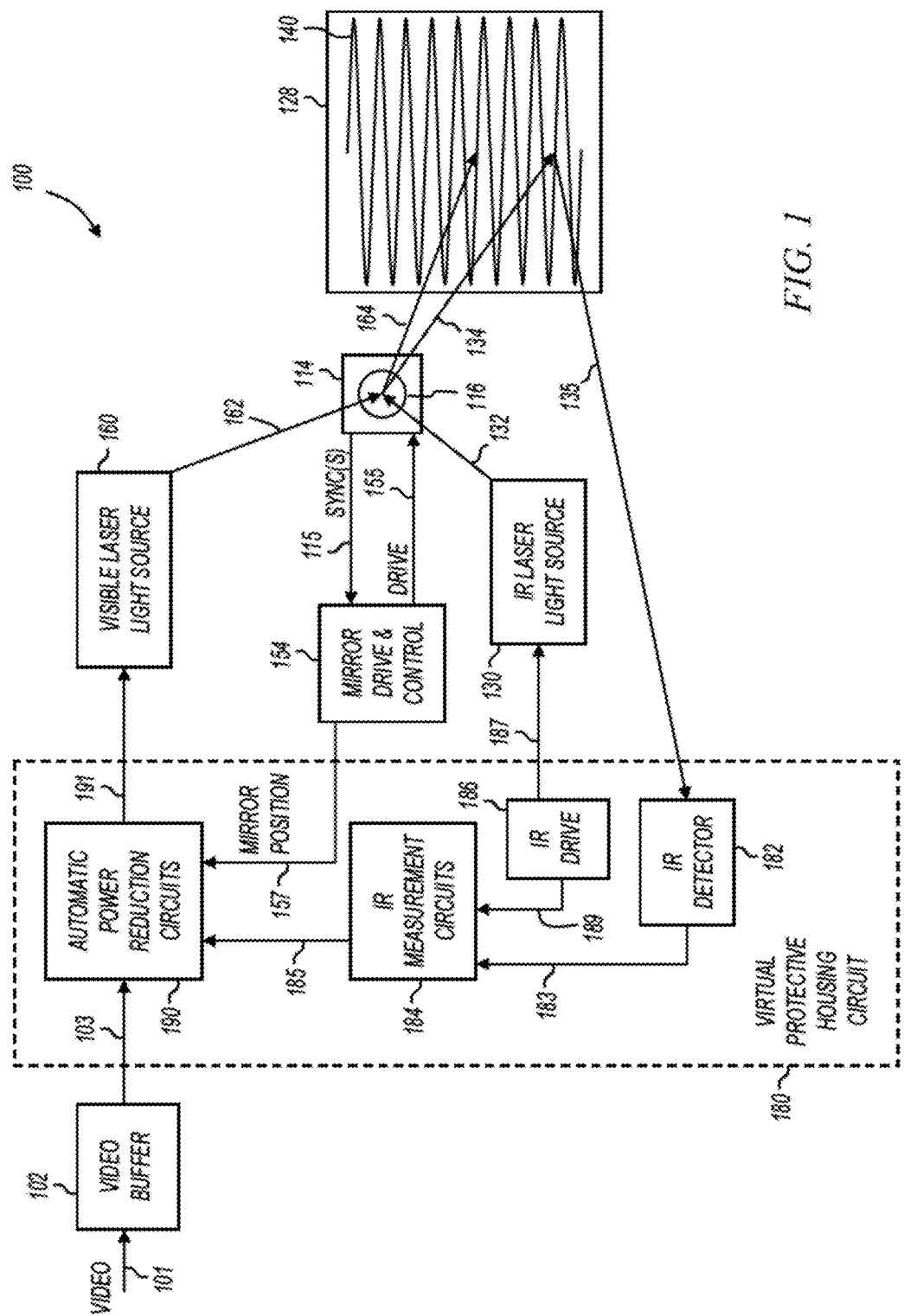
FIG. 1 shows a scanning laser projection system with automatic power reduction in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning laser projection system with automatic power reduction in accordance with various embodiments of the present invention. System 100 includes visible laser light source 160, infrared (IR) laser light source 130, scanning mirror assembly 114 with scanning mirror 116, and mirror drive and control circuit 154. System 100 also includes video buffer 102 and virtual protective housing circuit 180.

Visible laser light source 160 includes one or more light sources capable of emitting light in the visible spectrum. For example, in some embodiments, visible laser light source 160 includes multiple laser diodes that emit light at the same wavelength or at different wavelengths in the visible spectrum. For example, in some embodiments, laser light source 160 includes a first laser diode that emits red light, a second laser diode that emits green light, and a third laser diode that emits blue light. The terms "red," "green," and "blue" are used herein to refer to wavelengths that are perceived by a human eye as that particular color. For example, "red" refers to any wavelength of light that a human may perceive as the color red, "green" refers to any wavelength of light that a human may perceive as the color green, and "blue" refers to any wavelength of light that a human may perceive as the color blue.

In some embodiments, laser light source 160 includes optics whose purpose is to combine light beam paths such that light from any of light sources within light source 160 travels on the same or similar collimated path shown as modulated laser beam 162. The beam 162 impinges on a scanning mirror assembly 114 which in some embodiments is part of a microelectromechanical system (MEMS) based scanner or the like, and reflects off of scanning mirror 116 to generate a controlled output beam 164.

A scanning mirror drive and control circuit 154 provides one or more drive signal(s) 155 to control the angular motion of scanning mirror 116 to cause output beam 164 to traverse a raster scan trajectory 140 in a field of view 128. In operation, light source 160 produces modulated light pulses in the visible spectrum and scanning mirror 116 reflects the light pulses as beam 164 traverses raster scan trajectory 140 to produce a visible image in field of view 128.

In some embodiments, raster scan trajectory 140 is formed by combining a sinusoidal component on the horizontal axis and a sawtooth component on the vertical axis. In these embodiments, controlled output beam 164 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback.

In still further embodiments, the vertical sweep is sinusoidal. The various embodiments of the present invention are not limited by the waveforms used to control the vertical and horizontal sweep or the resulting raster pattern. The vertical axis is also referred to as the slow scan axis, and the horizontal axis is also referred to as the fast-scan axis. The labels "vertical" and "horizontal" are somewhat arbitrary, since a 90 degree rotation of the apparatus will switch the horizontal and vertical axes. Accordingly, the terms "vertical" and "horizontal" are not meant to be limiting.

Although scanning mirror 116 is shown as a single mirror that scans in two dimensions, this is not a limitation of the present invention. For example, in some embodiments, mirror 116 is replaced by two mirrors, one scanning in one dimension, and a second scanning in a second dimension. Further, although system 100 is described having one or more MEMS devices to perform scanning of laser light pulses, this is not a limitation of the present invention. Any device or method for scanning light pulses along a scan path may be employed without departing from the scope of the present invention.

In operation, mirror drive and control circuit 154 provides drive signal(s) 155 to control the angular motion of scanning mirror 116. In some embodiments, scanning mirror 116 includes one or more sensors to detect the angular position or angular extents of the mirror deflection (in one or both dimensions). For example, in some embodiments, scanning mirror assembly 114 includes a piezoresistive sensor that delivers a voltage that is proportional to the deflection of the mirror on the fast-scan axis. Further, in some embodiments, scanning mirror assembly 114 includes an additional piezoresistive sensor that delivers a voltage that is proportional to the deflection of the mirror on the slow-scan axis. The mirror position information is provided back to mirror drive and control circuit 154 as one or more SYNC signals 115. In these embodiments, mirror drive and control circuit 154 includes one or more feedback loops to modify the drive signals in response to the measured angular deflection of the mirror. In addition, in some embodiments, mirror drive and control circuit 154 includes one or more phase lock loop circuits to produces one or more signals 157 that estimates the instantaneous angular position of the scanning mirror based on the SYNC signals.

Mirror drive and control circuit 154 is implemented using functional circuits such as phase lock loops (PLLs), filters, adders, multipliers, registers, processors, memory, and the like. Accordingly, mirror drive and control circuit 154 may be implemented in hardware, software, or in any combination. For example, in some embodiments, control circuit 154 is implemented in an application specific integrated circuit (ASIC). Further, in some embodiments, some of the faster data path control is performed in an ASIC and overall control is software programmable.

IR laser light source 130 includes one or more laser light sources capable of emitting nonvisible light such as infrared (IR) light. For example, in some embodiments, IR laser light source 130 may include one or more laser diodes that produce infrared light with a wavelength of substantially 850 nanometers (nm). Also for example, in some embodiments, light source 130 may include one or more laser diodes that produce infrared light with a wavelength of substantially 900 nanometers (nm) The wavelength of light is not a limitation of the present invention. Any wavelength of light may be used without departing from the scope of the present invention.

In some embodiments, laser light source 130 includes optics whose purpose is to combine light beam paths such that light from any of light sources within light source 130 travels on the same or similar collimated path shown as modulated laser beam 132. The beam 132 reflects off of scanning mirror 116 to generate a controlled output beam 134 in the same manner that beam 162 reflects off scanning mirror 116 to generated controlled output beam 164.

In some embodiments, visible laser light source 160 and IR laser light source 130 feed light beams 162 and 132 to scanning mirror 116 at different angles resulting in an angular separation of controlled output beams 164 and 134 resulting in the IR laser light pulses traversing the field of view 128 out in front of the visible laser light pulses in one or both dimensions. For example, in some embodiments, the laser light sources are positioned relative the scanning mirror assembly to cause the IR laser light pulses to scan a non-zero number of scan lines ahead of the visible laser light pulses as shown in FIG. 1. Also for example, in some embodiments, the laser light sources are positioned relative to the scanning mirror assembly to cause the IR laser light pulses to scan ahead of the visible laser light pulses in both dimensions.

In some embodiments, both controlled output beams 164 and 134 traverse substantially the same raster scan trajectory 140 across the field of view 128, and in other embodiments, controlled output beams 164 and 134 traverse slightly different raster scan trajectories in part because they may have an angular separation that may not be an exact multiple of the angular separation of scan lines.

In some embodiments, IR laser light source 130 includes two laser light sources that are positioned relative to the visible laser light sources and the scanning mirror assembly to cause two separate controlled IR output beams that are on either side of the visible controlled output beam. For example, a first IR laser light source may produce controlled output beam 134 that scans ahead of controlled output beam 164 when scanning down as shown in FIG. 1, and a second IR laser light source may produce a second controlled IR output beam (not shown) that scans ahead of controlled output beam 164 when scanning up, either during a bidirectional scan (e.g., sinusoidal or triangular slow scan) or during flyback.

Video buffer 102 stores one or more rows of video content at 101 and provides drive values on node 103 to virtual protective housing circuit 180, which then conditionally passes the same drive values to visible laser light source 160. The drive values correspond to electrical currents used to drive laser light sources within light source 160 (e.g., red, green, and blue laser diodes) such that the output intensity from the lasers is consistent with the input video content. In some embodiments, this process occurs at output pixel rates in excess of 150 MHz.

Virtual protective housing circuit 180 includes IR drive circuit 186, IR detector 182, IR measurement circuits 184, and automatic power reduction circuits 190. IR drive circuit 186 produces pulsed signals on node 187 to drive IR laser light source 130. In some embodiments, the pulsed signals on node 187 are spaced in time such that projected IR laser light pulses have a spatial density in the field of view 128 sufficient to illuminate objects (other than the intended projection surface) that may be present in the field of view. For example, IR laser light pulses may be projected at that same spatial density as visible laser light pulses, or may be projected at a higher spatial density or lower spatial density than visible laser light pulses.

IR detector 182 includes one or more photosensitive devices capable of detecting reflections of IR laser light pulses. For example, IR detector 182 may include one or more PIN photodiodes, Silicon photomultipliers (SiPM), avalanche photodiodes (APD), or the like. Each point in the field of view that is illuminated with an IR laser light pulse (referred to herein as a "reflection point") reflects some amount of the incident light back to IR detector 182, and IR detector 182 provides a signal 183 to IR measurement circuits 184 that represents the timing and amplitude of the received reflections of IR laser light pulses.

IR measurement circuits 184 measure one or more attributes of the received reflections of IR laser light pulses. For example, in some embodiments, IR measurement circuits 184 measure times-of-flight (TOF) of IR laser light pulses to determine distances to reflection points. In some embodiments, IR drive 186 provides a timing signal 189 corresponding to the emission time of a particular IR laser light pulse to IR measurement circuits 184, and IR measurement circuits 184 measure the TOF of IR laser light pulses by determining the elapsed time between the emission of the pulse and reception of the reflection of the same pulse.

Also for example, IR measurement circuits 184 may measure an amplitude of reflections of IR laser light pulses to determine the albedo of the reflection points in the field of view. As used herein, the term "albedo" refers to the fraction of incident radiation that is reflected by a surface.

Automatic power reduction circuits 190 identifies one or more areas within the field of view to reduce power of the visible laser light pulses in response to received reflections of IR laser light pulses, and automatically reduces power of the visible laser light pulses in the identified area of the field of view. For example, in some embodiments, automatic power reduction circuits 190 may include spatial filters to determine areas of non-planarity of either depth data or albedo data. Also for example, automatic power reduction circuits 190 may include one or more blanking circuits that blank (reduce power to zero) video data arriving at 103 so that in the identified areas, the drive values at 191 are blanked to zero. These and other embodiments are described more fully below with reference to later figures.

In some embodiments, the power levels of the IR laser light pulses are less than the power levels of the visible laser light pulses. For example, in some embodiments, the power levels of the IR laser light pulses are maintained below the IEC 60825.1 Class 1 Accessible Emissions Limit, such that the IR laser light pulses can be constantly produced without risking injury to a human eye. In these embodiments, the visible laser light pulses may exhibit power levels that are not considered eye-safe without some other safety measures such as a protective housing.

In some embodiments, the virtual protective housing circuits of the present invention operate to reduce accessible emission levels to levels similar to those provided by physical protective housings. For example, various embodiments of the present invention automatically reduce the power of visible laser light emissions in identified areas of the field of view to ensure that emissions accessible to a human eye are kept below eye-safe levels.

Figure 2:
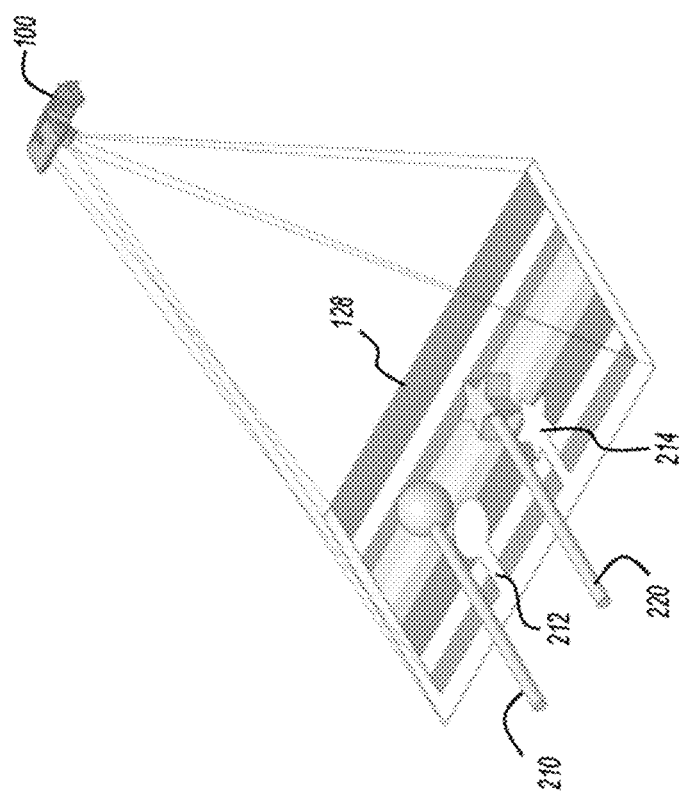
FIG. 2 shows objects in a field of view of a scanning laser projector in accordance with various embodiments of the present invention.

FIG. 2 shows objects in a field of view of a scanning laser projector in accordance with various embodiments of the present invention. Scanning laser projection system 100 is shown projecting video content in field of view 128. The video content is represented in the figure by the horizontal stripes in the field of view. Two objects 210 and 220 are shown in the field of view in front of the projection surface. Areas of reduced power are shown at 212 and 214.

Various embodiments of the present invention detect objects 210 and 220 in the field of view and reduce the power of visible laser light emissions in the area of the objects to provide a virtual protective housing that protects the objects from accessing laser radiation levels above eye-safe limits.

Figure 3:
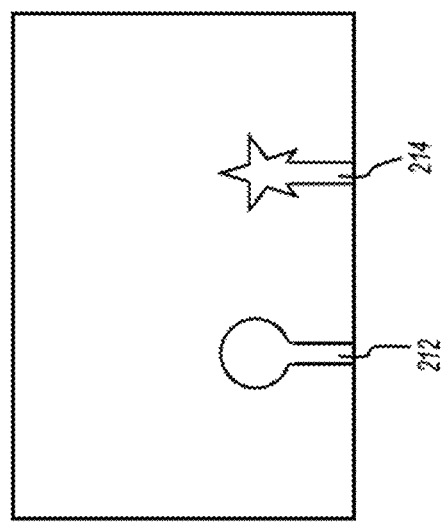
FIG. 3 shows areas of reduced power in the field of view in accordance with various embodiments of the present invention.

FIG. 3 shows areas of reduced power in the field of view in accordance with various embodiments of the present invention. Areas 212 and 214 are identified by scanning laser projection system 100 as areas to reduce power, and the emitted laser power in these areas is automatically reduced. Area 212 corresponds to the area of the field of view surrounding object 210, and area 214 corresponds to the area of the field of view surrounding object 220.

In some embodiments, areas 212 and 214 are identified by virtual protective housing circuits 180 (FIG. 1) by filtering depth data and determining areas of the field of view that are non-planar or that are closer to the projection system than the rest of the projection surface. These determinations may be made by measuring reflections of IR laser light pulses from reflection points that are out in front of the visible laser pulses in the scan trajectory. In other embodiments, areas 212 and 214 are identified by virtual protective housing circuits 180 (FIG. 1) by filtering albedo data and determining areas of the field of view that have variations in albedo.

Figure 4:
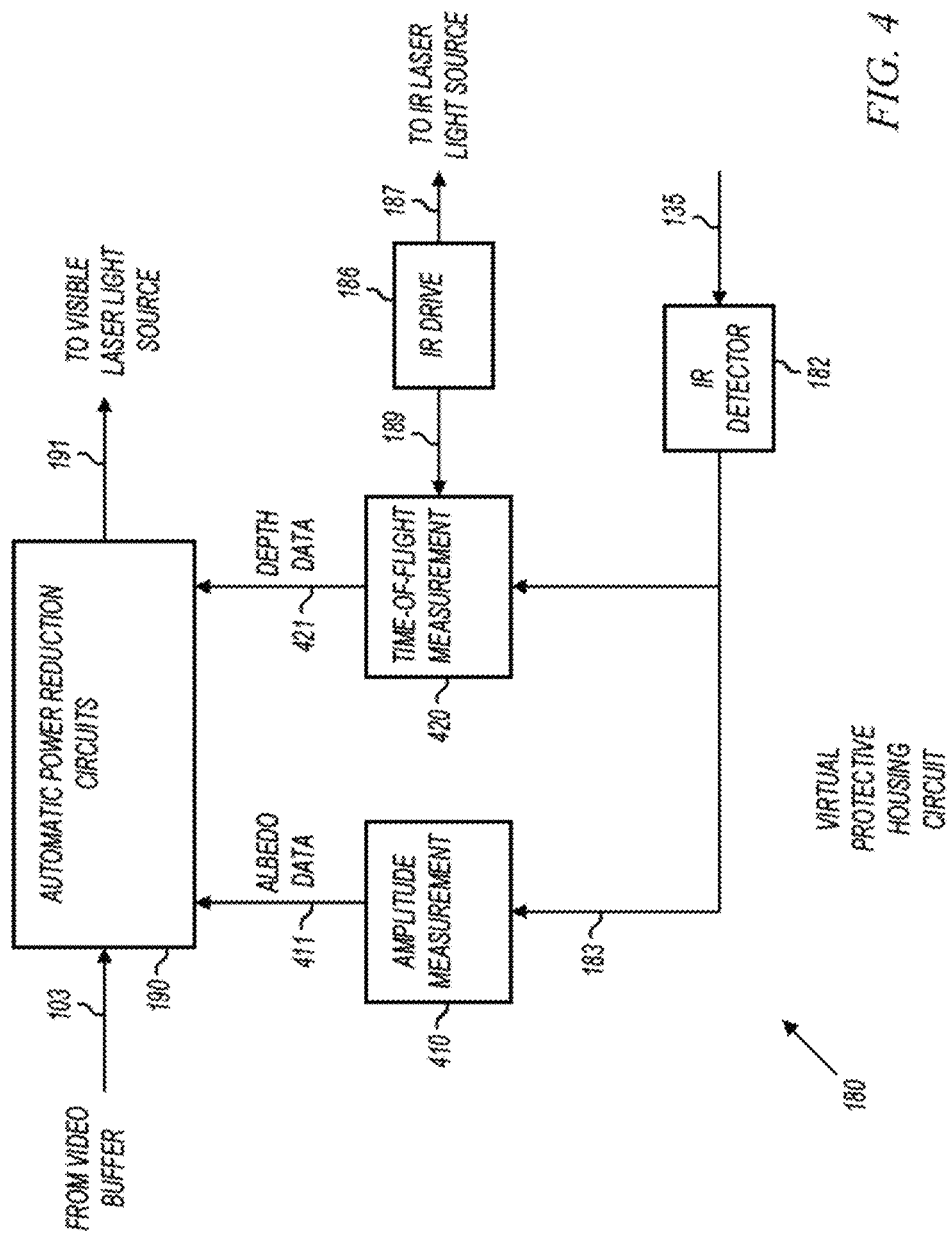
FIG. 4 shows a virtual protective housing circuit in accordance with various embodiments of the present invention.

FIG. 4 shows a virtual protective housing circuit in accordance with various embodiments of the present invention. Virtual protective housing circuit 180 includes IR detector 182, IR drive 186, automatic power reduction circuits 190, and IR measurement circuits that include amplitude measurement circuits 410 and time-of-flight measurement circuits 420. In some embodiments, IR drive 186 includes circuits suitable to drive IR laser light sources. For example, IR drive 186 may include timing circuits to produce pulses, digital-to-analog converters, filters, amplifiers, and the like.

In operation, IR drive 186 drives IR laser light source at 187 to cause the IR laser light source to produce IR laser light pulses which are scanned in a field of view by a scanning mirror assembly. Reflections of the IR laser light pulses are received by IR detector 182, and signals are provided to the measurement circuits at 183. Amplitude measurement circuit 410 may include any suitable circuit element capable of measuring an amplitude of the detected signal at 183. For example, in some embodiments, a peak detector circuit may be included to detect a peak amplitude of the signal at 183. The measured amplitude of the signal at 183 corresponds to the albedo of the reflection point in the field of view, and is provided to automatic power reduction circuits 190 as albedo data at 411.

Time-of-flight measurement circuit 420 receives a timing signal from IR drive 186 at 189 that represents the time at which an IR pulse was emitted, and also receives the reflected signal at 183. Various embodiments of TOF measurement circuit 420 compare the timing of the two signals to determine a distance to the reflection point in the field of view, and is provided to automatic power reduction circuits 190 as depth data at 421.

In some embodiments, albedo data and depth data is buffered along with mirror position data to provide an array of data points that represent albedo and depth across at least a portion of the field of view. This data is processed by automatic power reduction circuits 190 to provide automatic power reduction at the appropriate time in the scan trajectory. In other embodiments, the data pipeline delay in the measurement circuits and automatic power reduction circuits matches the time offset between the modulated IR laser beam and the modulated visible laser beam such that no buffering necessary.

Figure 5:
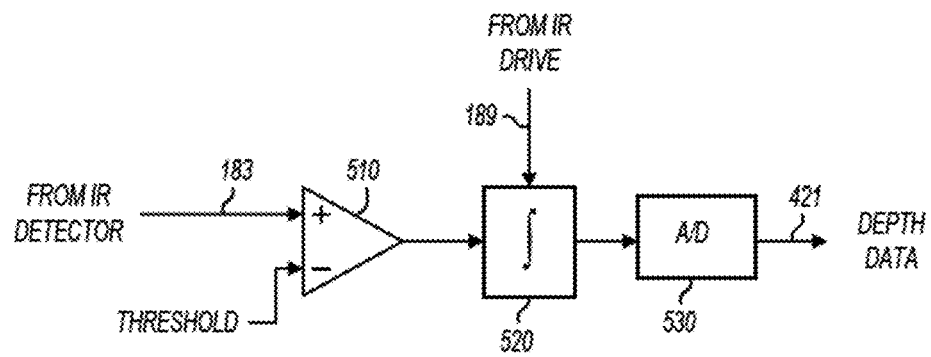
FIG. 5 shows a time-of-flight measurement circuit in accordance with various embodiments of the present invention.

FIG. 5 shows a time-of-flight measurement circuit in accordance with various embodiments of the present invention. Time-of-flight measurement circuit 420 measures the TOF of IR laser light pulses and provides the results as depth data at 421.

Integrator 520 receives the pulse timing 189 corresponding to the timing of the emission of an IR laser light pulse. Integrator 520 starts an integration period when a light pulse is emitted, and the integration period is stopped when the amplitude of the reflected pulse exceeds the threshold as determined by comparator 510. Analog-to-digital converter (A/D) 530 receives the output of integrator 520 and produces a digital signal at 421 that corresponds to the time-of-flight (TOF) of the laser pulse, which in turn corresponds to the distance (Z) between TOF measurement circuit 420 and the reflection point in the field of view.

The time-of-flight measurement circuit shown in FIG. 5 is an example circuit that may be implemented in system 100 (FIG. 1). In some embodiments, different circuits are used to measure time-of-flight. For example, in some embodiments, a digital counter is used to measure the time between the emission of an IR laser light pulse and the detection of a reflection of the same IR laser light pulse.

Figure 6:
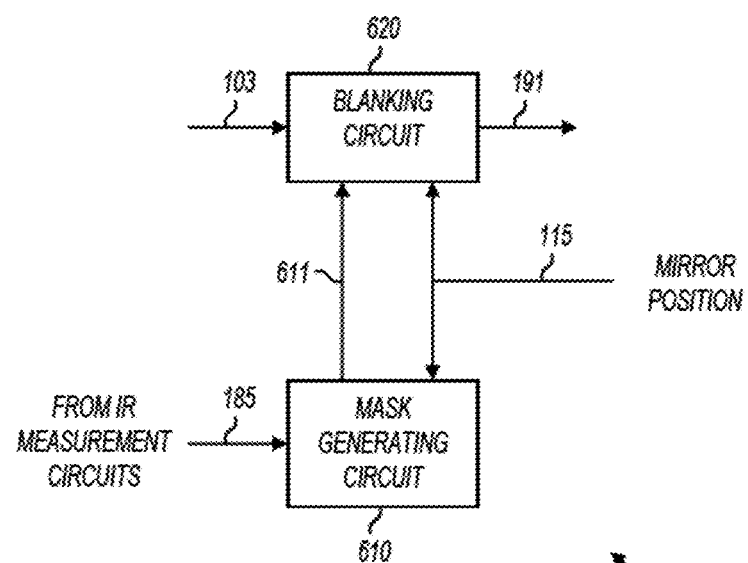
FIG. 6 shows an automatic power reduction circuit in accordance with various embodiments of the present invention.

FIG. 6 shows an automatic power reduction circuit in accordance with various embodiments of the present invention. Automatic power reduction circuit 190 includes mask generating circuit 610 operable to create a mask in response to the IR measurement circuits, and blanking circuitry to block visible laser light pulses from being emitted in at least a portion of the field of view in response to the mask.

As used herein, the term "automatic power reduction" refers to power reduction that occurs without direct human intervention. An example of automatic power reduction is shown in FIG. 6 where the power of visible pulses is reduced in response to reflections of IR laser light pulses without human intervention in the real-time decision process.

In some embodiments, masking generating circuit 610 produces a buffered data set that includes masking information as well as mirror position information that specifies where the masking information is to be applied in the field of view. In these embodiments, mask data 611 may include tuples that each include mirror position and masking information, or (x,y,b), where (x,y) is a location in the field of view, and (b) is a bit that specifies whether to mask visible laser light emissions at location (x,y). In other embodiments, the pipeline delay introduced by mask generating circuit 610 and blanking circuit 620 matches the time delay between IR laser light pulses and visible laser light pulses illuminating the same area in the field of view, and masking information at 611 is used to blank visible emissions when received. In these embodiments, mirror position information may not be utilized by either mask generating circuit 610 or blanking circuit 620.

Figure 7:
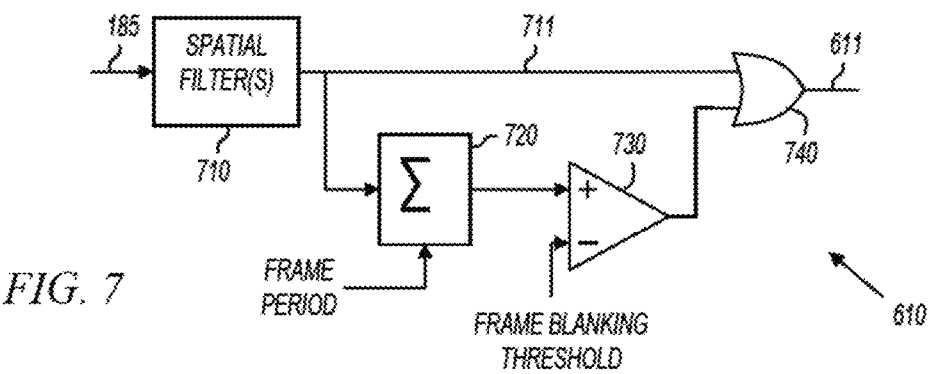
FIG. 7 shows a mask generating circuit in accordance with various embodiments of the present invention.

FIG. 7 shows a mask generating circuit in accordance with various embodiments of the present invention. Mask generating circuit 610 includes spatial filter(s) 710, accumulator 720, comparator 730, and masking gate 740.

In operation, data from IR measurement circuits is filtered by spatial filter(s) 710 to create a mask bit 711. In some embodiments, spatial filter(s) 710 performs a planarity determination, and the mask bit at 711 is asserted for areas of non-planarity. When applied to depth data, the non-planarity determination identifies objects within the field of view as shown in FIG. 2. When applied to albedo data, the non-planarity determination identifies projection surfaces that have variations in albedo.

Various embodiments of mask generating circuit 610 may also blank the entire field of view when the area to be blanked as determined by spatial filter(s) exceeds a threshold. For example, accumulator 720 may accumulate blanking bits over a frame period corresponding to one complete traversal of the scan trajectory in the field of view. When the accumulated value exceeds a frame blanking threshold, comparator 730 may assert an output for an entire frame period, causing blanking gate 740 to assert the masking information at 611 for an entire frame period.

Figure 8:
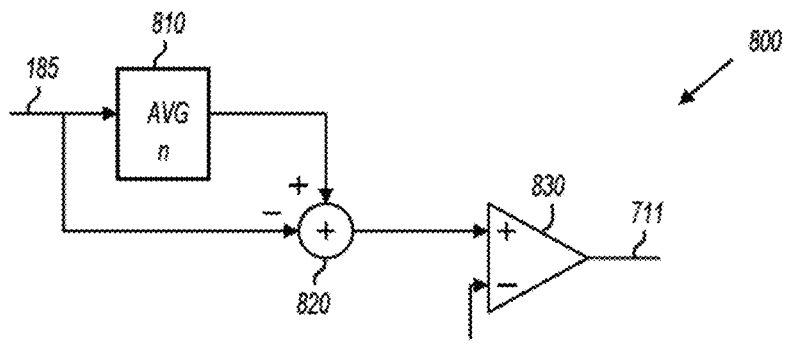
FIGS. 8 and 9 show spatial filters in accordance with various embodiments of the present invention.
Figure 9:
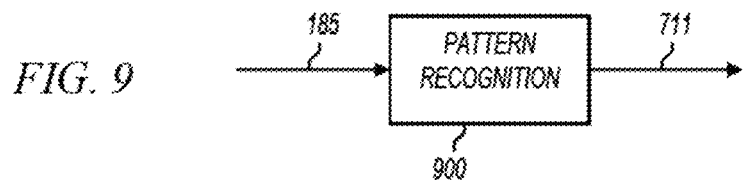

FIGS. 8 and 9 show spatial filters in accordance with various embodiments of the present invention. Spatial filters 800 and 900 are examples of spatial filters that may be used to implement spatial filter(s) 710 (FIG. 7). Spatial filters 800 and 900 are examples of spatial filters, and the various embodiments of the present invention are not limited in this respect. Any filtering algorithm may be employed to determine masking bits based on measurements of reflected IR laser light pulses.

Spatial filter 800 includes averaging circuit 810, summer 820, and comparator 830. In operation, averaging circuit 810 averages the measured IR laser light pulse attribute over n samples, and summer 820 takes the difference between the averaged value and the current value. If the difference is greater than a threshold, comparator 830 asserts the mask bit at 711. Spatial filter 800 implements a planarity detector for projection surfaces that have a substantially constant distance from the projection system. In some embodiments, the spatial filter determines a best fit plane for the projection surface and compares the current distance value to the best fit plane. Other embodiments record the shape of the projection surface and compare the current value to the recorded shape to detect objects in the field of view.

Spatial filter 900 implements a pattern recognition algorithm. Examples include a neural network trained to identify patterns. For example, spatial filter 900 may recognize the shape of a human head, hand, or finger. In general, spatial filter 900 may recognize any pattern when identifying areas in the field of view to reduce power of visible laser light pulses.

Figure 10:
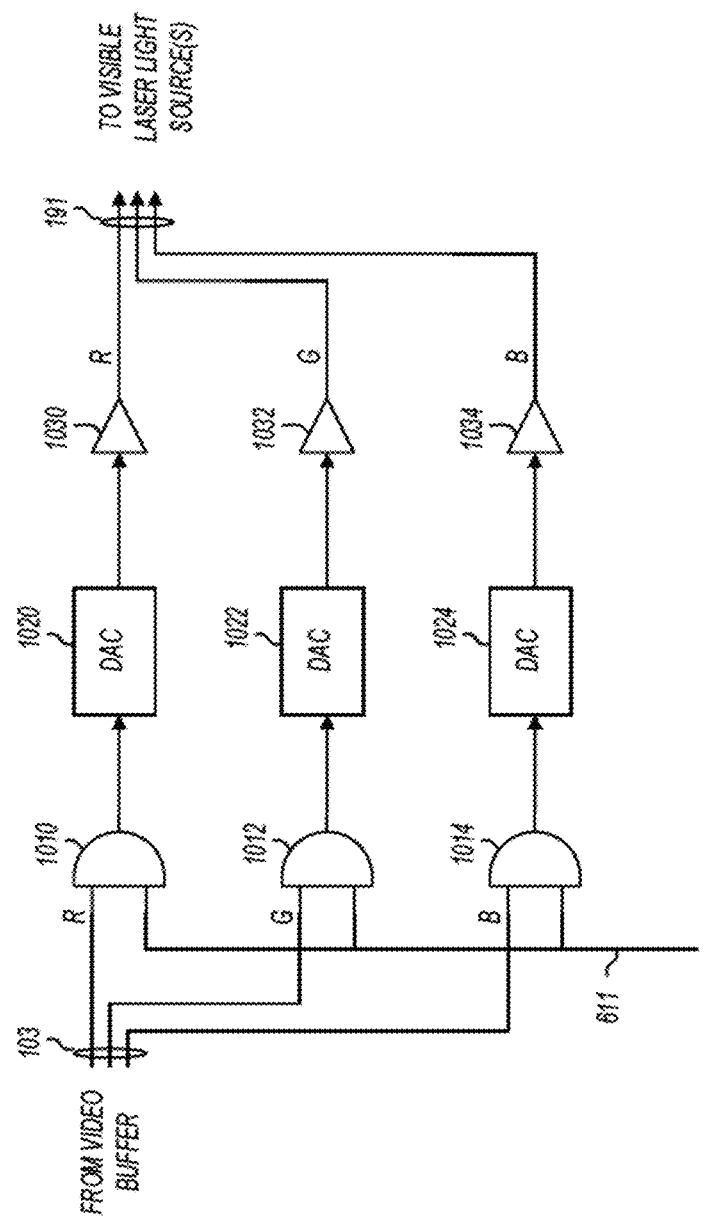
FIG. 10 shows a blanking circuit in accordance with various embodiments of the present invention.

FIG. 10 shows a blanking circuit in accordance with various embodiments of the present invention. Blanking circuit 620 includes blanking gates 1010, 1012, and 1014, digital-to-analog converters (DAC) 1020, 1022, and 1024, and amplifiers 1030, 1032, and 1034.

In operation, blanking circuit 620 receives video data 103 from video buffer 102 (FIG. 1). In embodiments represented by FIG. 10, the video data includes digital data that represents the intensity of red, green, and blue light for a given pixel to be displayed in the field of view. The mask bit at 611 operates to blank the red, green, and blue data when asserted, thereby reducing the power to zero. When not blanked, DACs 1020, 1022, and 1024 convert the digital values to analog values, and amplifiers 1030, 1032, and 1034 amplify and condition the drive signals to be sent to the visible laser light sources 191.

The blanking circuit implementation shown in FIG. 10 is an example of a circuit that reduces the power of visible laser light emissions, and the various embodiments of the present invention are not limited in this respect. For example, in some embodiments, automatic power reduction may be performed by variable gain amplifiers, attenuators, digital shifters or subtractors, or the like.

Figure 11:
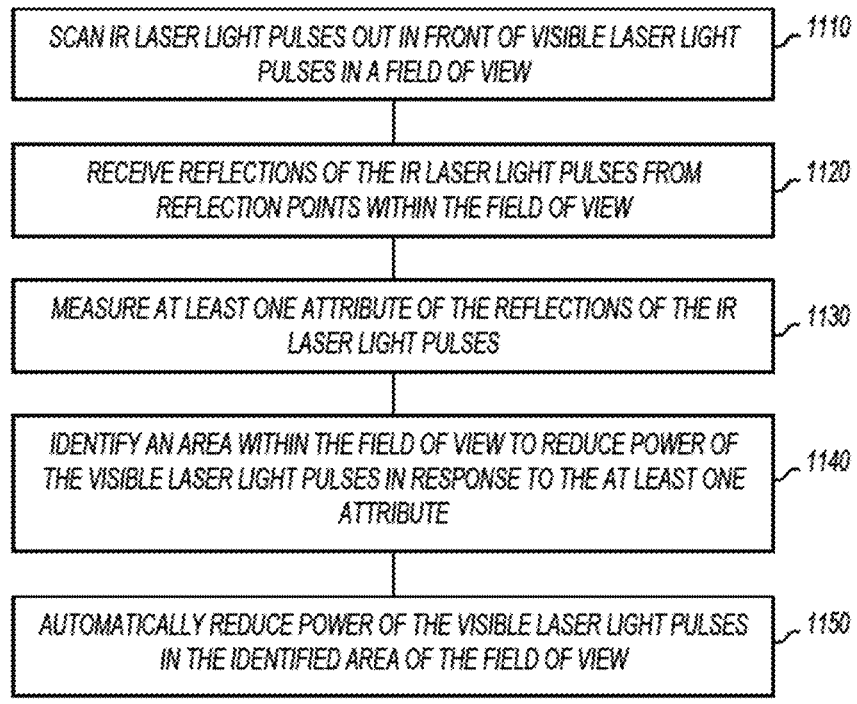
FIG. 11 shows a flow diagram of methods in accordance with various embodiments of the present invention.

FIG. 11 shows a flow diagram of methods in accordance with various embodiments of the present invention. In some embodiments, method 1100, or portions thereof, is performed by a scanning laser projection system, embodiments of which are shown in previous figures. In other embodiments, method 1100 is performed by a series of circuits or an electronic system. Method 1100 is not limited by the particular type of apparatus performing the method. The various actions in method 1100 may be performed in the order presented, or may be performed in a different order. Further, in some embodiments, some actions listed in FIG. 11 are omitted from method 1100.

Method 1100 is shown beginning with block 1110. As shown at 1110, IR laser light pulses are scanned out in front of visible laser light pulses in a field of view. In some embodiments, an IR laser light source and a visible laser light source are positioned relative to a scanning mirror assembly to cause an angular separation between the IR laser light pulses and the visible laser light pulses. In some embodiments, the IR laser light pulses are maintained at an eye-safe power level, so that when the IR laser light pulses are the only laser radiation emitted from the device performing method 110, the device is considered eye-safe. Unlike the IR laser light pulses, the visible laser light pulses, when present, may have higher emission levels that would be considered non-eye-safe when operated without a virtual protective housing with automatic power reduction.

At 1120, reflections of the IR laser light pulses from reflection points within the field of view are received. In some embodiments, this corresponds to a photosensitive device detecting the IR pulses as described above. At 1130, at least one attribute of the reflections of the IR laser light pulses are measured. In some embodiments, an amplitude of the reflections is measured. Also in some embodiments, a time-of-flight of IR laser light pulses is measured.

At 1140, an area within the field of view to reduce power of the visible laser light pulses in response to the at least one attribute is identified. For example, in some embodiments, an area of non-planarity may be identified to reduce power. This may correspond to an area within the field of view that encompasses one or more objects such as shown in FIGS. 2 and 3.

At 1150, the power of the visible laser light pulses in the identified area of the field of view is automatically reduced. In some embodiments, this corresponds to blanking the visible laser light pulses, and in other embodiments, this corresponds to reducing the power of the visible laser light pulses to eye-safe levels.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a first laser light source to emit visible laser light pulses;
   a scanning mirror assembly to scan the visible laser light pulses in two dimensions in a field of view,
   a second laser light source to emit infrared (IR) laser light pulses, wherein the first and second laser light sources are positioned relative to the scanning mirror assembly to cause the IR laser light pulses to scan ahead of the visible laser light pulses in at least one of the two dimensions in the field of view;
   time-of-flight measurement circuitry to produce depth data representing distances to a projection surface in the field of view in response to received reflections of IR laser light pulses;
   amplitude measurement circuitry to produce albedo data representing albedo of reflection points within the field of view in response to the received reflections of the IR laser light pulses;
   mask generating circuitry operable to create a mask in response to the depth data and in response to the albedo data indicating variations in the albedo of the reflection points over the projection surface; and
   blanking circuitry to block visible laser light pulses from being emitted in at least a portion of the field of view in response to the mask.

2. The apparatus of claim 1 wherein the mask generating circuitry comprises a planarity detector and wherein the mask generating circuitry creates the mask in response to the depth data by additionally creating the mask in areas where the depth data indicates non-planarity over the projection surface.

3. The apparatus of claim 1 wherein the mask generating circuitry is operable to create the mask in response to the albedo data indicating variations in the albedo of the reflection points over the projection surface by creating the mask in areas of the field of view having non-uniform albedo.

4. The apparatus of claim 3 wherein the mask generating circuitry is operable to mask the entire field of view in response to the albedo data indicating variations in the albedo of the reflection points over a size of area that exceeds a threshold.

5. The apparatus of claim 1 wherein the IR laser light pulses emissions are below an eye-safe threshold.

6. The apparatus of claim 1 wherein the visible laser light pulses emissions are above an eye-safe threshold when not blanked.

7. The method of claim 1 further comprising reducing power of the visible laser light pulses in the entire field of view in response to size of the area within the field of view having reflection points with variations in albedo exceeding a threshold.

8. A method comprising:
   scanning infrared (IR) laser light pulses out in front of visible laser light pulses in a field of view;
   receiving reflections of the IR laser light pulses from reflection points within the field of view;
   measuring times of flight of the reflections of the IR laser light pulses to produce depth data;
   detecting an area of non-planarity in the depth data;
   reducing power of the visible laser light pulses in the area of non-planarity;
   measuring amplitudes of signals corresponding to the received reflections of the IR laser light pulses to produce albedo data representing albedo of reflection points within the field of view;
   detecting an area within the field of view having reflection points with variations in albedo using the albedo data; and
   reducing power of the visible laser light pulses in the area within the field of view having the reflection points with variations in albedo.

9. The method of claim 8 wherein reducing power of the visible laser light pulses comprises reducing power to zero.

10. The method of claim 8 further comprising reducing power of the visible laser light pulses in the entire field of view when a size of the area of non-planarity exceeds a threshold.

11. The method of claim 8 wherein the detecting the area within the field of view having the reflection points with variations in albedo using the albedo data comprises determining where in the field of view the variations in albedo are indicated by non-uniformity in amplitude that exceeds a threshold.

12. An apparatus comprising:
a first laser light source to emit visible laser light pulses;
a scanning mirror assembly to scan the visible laser light pulses in a field of view;
a second laser light source to produce infrared (IR) laser light pulses, wherein the first and second laser light sources are positioned relative to the scanning mirror assembly to cause the IR laser light pulses to scan a portion of the field of view at a different time than the visible laser light pulses scan the portion of the field of view;
an IR detector to receive reflections of the IR laser light pulses and generate corresponding signals;
measurement circuitry to determine a measure of amplitude of the signals corresponding to the received reflections of the IR laser light pulses and produce albedo data representing albedo of reflection points within the field of view;
mask generating circuitry operable to create a mask in response to the albedo data indicating variations in the albedo of the reflection points within the field of view; and
blanking circuitry to automatically reduce power of the visible laser light pulses in at least a portion of the field of view in response to the mask.

13. The apparatus of claim 12 further comprising time-of-flight measurement circuitry to produce depth data representing distances to the reflection points within the field of view in response to the received reflections of IR laser light pulses.

14. The apparatus of claim 13 further comprising a planarity detector operable to detect non-planarity in the reflection points within the field of view from the depth data.

15. The apparatus of claim 12 wherein the mask generating circuitry is operable to create the mask in response to the albedo data indicating variations in the albedo of the reflection points within the field of view by determining where in the field of view non-uniformity in the albedo exceeds a threshold.

16. The apparatus of claim 12 wherein the blanking circuitry automatically reduces power of the visible laser light pulses in the at least a portion of the field of view to below an eye-safe threshold power.

* * * * *